Aug. 3, 1943. K. A. OPLINGER 2,326,060
ELECTRICAL SWITCHING APPARATUS
Filed May 13, 1942

WITNESSES:
Robert C. Baird
Wm. C. Groome

INVENTOR
Kirk A. Oplinger.
BY
James N. Ely
ATTORNEY

Patented Aug. 3, 1943

2,326,060

UNITED STATES PATENT OFFICE 2,326,060

ELECTRICAL SWITCHING APPARATUS

Kirk A. Oplinger, Verona, Pa., assignor to Westinghouse Electric & Manufacturing Company, East Pittsburgh, Pa., a corporation of Pennsylvania Application May 13, 1942, Serial No. 442,772

7 Claims. (Cl. 200—152)

This invention relates to electrical switching apparatus.

It is an object of this invention to provide a switching apparatus, the operation of which is unaffected by any changes in temperature or atmospheric pressure which otherwise would change the operating characteristics of the switching apparatus.

Other objects of this invention will become apparent from the following description when taken in conjunction with the accompanying drawing, in which:

Fig. 2 is a bottom plan view of one of the elements forming the switching apparatus of Fig. 1; and Fig. 3 is a top plan view, slightly reduced, of another of the elements utilized in forming the switching apparatus of Fig. 1.

Figure 1:
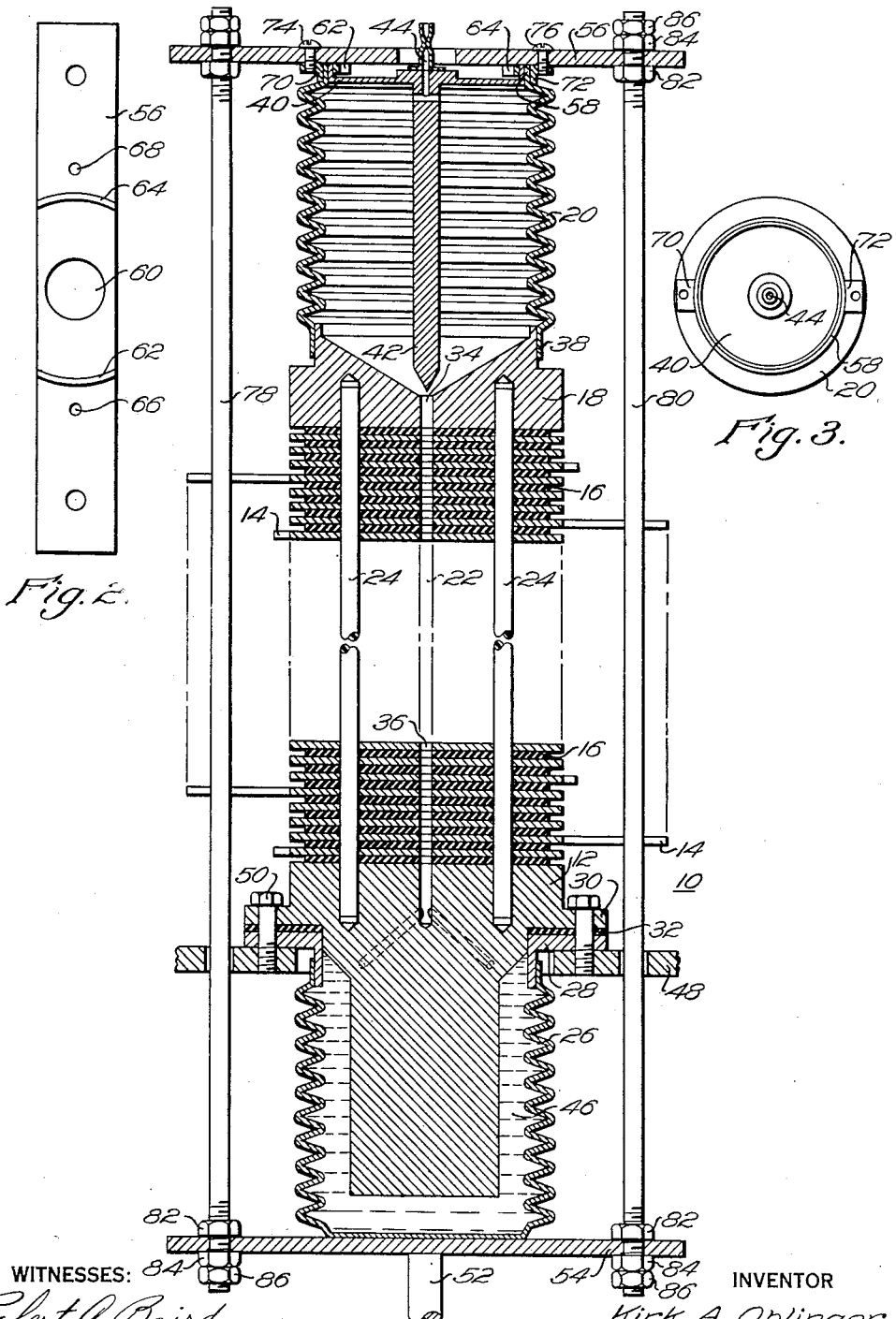
Figure 1 is a view in elevation and partly in section of the switching apparatus of this invention.

Referring to the drawing and particularly to Fig. 1, this invention is illustrated by reference to a switching apparatus 10. The switching apparatus 10 comprises a suitable base member 12 on which a plurality of conductor members or leaves 14 are stacked in spaced relation and maintained in spaced relation by means of a plurality of spacer members 16 disposed adjacent the conductor leaves. At the upper end of the alternate stacked assembly of the conductor leaves 14 and the spacer members 16, there is positioned a suitable top member 18 which carries a bellows 20 which functions as a gas chamber.

The construction of the switching apparatus 10 formed of the alternately stacked conductor leaves 14 and spacer members 16 is more clearly described in my copending application, now issued as Patent No. 2,307,535, the construction therein described being made by reference to a part of this specification. However, in order that the construction utilized in this invention is understood, a brief description of the elements is given.

The conductor members 14 are of any suitable material, such as stainless steel or the like, and are of an elongated rectangular shape having one end tapered to provide a terminal or tap to which leads may be connected.

The spacer members 16 are of any suitable insulating material which can be bonded to the conductor members 14 and the base member 12 and top member 18, and which will maintain a predetermined space between the conductor members 14. Preferably the spacer members 16 are formed of fibrous material impregnated with or carrying a film of thermo-plastic resinous bonding material.

In building the stack, the conductor members are stacked alternately with the spacer members 16 on the base member 12 with the conductor members 14 so disposed that the terminal or tap of each succeeding conductor member extends outwardly from a different side of the assembly, with the terminal being adjacent one edge of the substantially rectangularly shaped conductor member. By reversing every fifth conductor member in the stack, it is possible to provide eight stacks of the staggered terminals extending outwardly from the stacked assembly. Each of the spaced conductor members 14 is also provided with a central opening which cooperates with the opening of the spacer members 16 when alternately stacked therewith to provide a well 22. Reinforcing rods 24 of fibrous insulating material are also provided and disposed in spaced relation about the well 22 and extend through suitable openings in the conductor members 14 and the spacer members 16 with their opposite ends terminating in recesses in the base member 12 and the top member 18.

A bellows 26 secured to an outwardly extending flange member 28 is disposed to be secured to the base member 12. The bellows 26 is of the same size and has the same area as the upper bellows 20. As illustrated, the flange member 28 is secured to the flange 30 of the base member 12 by means of a fibrous gasket 32 of insulating material impregnated or coated with the same thermoplastic bonding medium which is employed in conjunction with the spacer members 16. Both the top member 18 and the base member 12 have openings 34 and 36, respectively, disposed in alignment with the well 24 of the stack, the opening 36 extending through the base member 12 to the space between the bellows and the downwardly extending elongated portion of the base member 12.

The bellows 20, carried by the top member 18, is secured to an annular rim 38 on its upper surface as by welding (not shown) so as to provide a leakproof joint therebetween. The upper end of the bellows 20 is formed of a substantially heavy plate 40 which is sealed to the upper edge of the bellows as by welding. This plate 40 carries a downwardly projecting valve member 42 which, in the normal operative position for the bellows 20, as illustrated in Fig. 1, is spaced from the upper end of the well 22. This valve is provided for facilitating the shipping of the switching apparatus 10, and the details of the construction and operation thereof are disclosed in my copending application now issued as Patent No. 2,281,044. The plate 40 is also provided with a duct 44 which opens into the bellows 20, the purpose of which will be described hereinafter.

With the elements assembled as described, the assembly is subjected to a temperature of about 120° C. while applying pressure to cause the thermoplastic bonding material carried by the spacer members 16 and the gasket 32 to bond the different elements into an integral leakproof structure. When bonded in this manner, it is found that the bonding material flows to and firmly bonds the reinforcing members 24 in the assembly as well as individual conducting members and bottom member. As thus sealed, the stack assembly is resistant to mechanical shock and is leakproof.

When sealed as described hereinbefore, the well 22 and the space in the bellows 26 and the gas chamber formed by the bellows 20 are evacuated and a predetermined quantity of liquid conducting material such as mercury 46 is introduced into the bellows 26 and the well 22 through the duct 44 provided in the top of the bellows 20. A gas, such as hydrogen, capable of reducing arcing is then introduced into the upper bellows 20 and the well 22 above the mercury, after which the duct 44 is sealed off as illustrated as by means of soldering.

The sealed and filled assembly formed by the alternately stacked members and the opposed sealed bellows is disposed to be mounted on a panel (not shown) or some other supporting member as by means of the flange 48 which is secured to the base member 12 by the bolts 50. Normally, the switching apparatus is disposed to be operated as by means of a driving member 52 which is secured at one of its ends in any suitable manner to the bottom of the lower bellows 26. A force applied to the bellows 26 in response to some predetermined condition thus actuates the mercury in the bellows 26 upwardly through the well 22 to progressively bridge the conductor members 14. Of course, as the mercury 46 is forced upwardly through the well 22, the gas in the well and bellows above the mercury is displaced from the well 22 and forced into the bellows 20.

As thus constructed and mounted, any change in the atmospheric pressure or a change in the temperature will effect the operation of the switching apparatus 10, since the volume of the gas above the mercury is directly affected by such changes. For example, an increase in the temperature of the gas above the mercury column in the well 22 causes an expansion of the gas to increase the pressure on the mercury column and tend to elongate both the bellows 20 and 26, whereas an increase in atmospheric pressure applies an additional force to the bellows tending to force the mercury higher in the well.

In order to maintain the operation of the switching apparatus unaffected by changes in temperature and/or atmospheric pressure, the opposed bellows 20 and 26 are connected externally of the stack assembly to hold or maintain the bellows in the same operative position relative to each other regardless of the change in temperature or atmospheric pressure.

As illustrated, the switching apparatus 10 is provided with a plurality of cross bars 54 and 56, the cross bar 54 being preferably welded to the base of the bellows 26. The cross bar 56 is so constructed as to cooperate with the upper bellows 20 as to apply a force thereto about the annular rim 58 of the bellows 20 in alignment with the force which may be applied through the cross bar 54.

Referring to Fig. 2, the cross bar 56 is illustrated as having a large central opening 60 which, when the cross bar 56 is positioned in operative relation with the bellows 20, permits the duct 44 to project therethrough as illustrated in Fig. 1. In addition, the cross bar 56 is provided with two downwardly projecting flange members 62 and 64 which are so shaped and positioned on the cross bar 56 as to just fit within the annular rim 58 of the bellows 20 to aid in positioning the cross bar. A plurality of openings 66 and 68 are also provided and are in alignment with the openings of lug members 70 and 72 which are carried on the outer periphery of the annular rim member 58 of the bellows 20. The cross bar 56 can thus be removably secured to the bellows 20 by means of the screw members 74 and 76, as illustrated in Fig. 1.

When the switching apparatus is mounted in its operative position on the panel (not shown), and the cross bar 56 is secured to the upper bellows 20, the cross bars 54 and 56 are rigidly connected by means of the tie bar members 78 and 80 which extend through aligned openings in the cross bars and the support 48. As illustrated in Fig. 1, the tie bars 78 and 80 are secured to each of the cross bars 54 and 56 and maintained in their relative operative positions by means of the adjustable nuts 82 and 84 mounted on the end of each tie bar on opposite sides of the cross bars. In addition to the nuts 82 and 84, a locknut 86 may be provided on the ends of the tie bars to prevent accidental turning of the nut 84. Thus, by adjusting the positions of the nuts 82 and 84 and also the locknut 86, any predetermined force, either compression or tension, can be applied to the opposed bellows 20 and 26 for any given temperature or atmospheric pressure. With the opposed bellows connected in this manner, when a force is applied to the apparatus through the driver 52, a positive equal movement of the opposed bellows in the same direction relative to the stack is obtained whereby the progressive bridging of the contact members 14 is effected.

If a change in temperature is encountered, the gas within the bellows 20 expands and applies a force to the column of mercury as well as the bellows 20. Since both the bellows 20 and 26 are rigidly connected together, neither of the bellows 20 nor 26 moves relative to one another and the column of mercury maintains itself at the same height within the well 22 and is unaffected by the change in the pressure of the gas. Likewise, changes in the atmospheric pressure do not affect the height of the mercury column within the well 22, since the bellows 20 and 26 are rigidly connected together and the change in the atmospheric pressure cannot be transmitted to the column of mercury. Thus, for any operative position of the driver member 52 the operation of the switching apparatus is substantially unaffected by changes in temperature or atmospheric pressure, the only medium for varying the height of the mercury column being the force applied to the switching apparatus through the driver member 52, or by changing the force applied to the bellows by adjusting the setting of the nuts associated with the tie bolts.

In my copending application, now issued as Patent No. 2,298,151, I have disclosed and claimed a compensating switch apparatus in which means external of the operating bellows is utilized for compensating for any changes in temperature or atmospheric pressure. The compensated switching apparatus of this invention, however, is simpler in construction and does not require the adjustments during service which are sometimes necessary in my prior compensated switching apparatus.

Although this invention has been described with reference to a particular embodiment thereof, it is, of course, not to be limited thereto except in so far as is necessitated by the scope of the appended claims.

I claim as my invention:

1. In a switching apparatus, a well adapted to receive a conducting liquid, the well being formed of a stack of alternately disposed conductor members and insulating spacer members having aligned openings therein, opposed bellows disposed at the ends of the stack communicating with the well, means for sealing the stack of alternately disposed conductor members and insulating spacer members and the opposed bellows into a gas and liquid leak-proof unit, a conducting liquid carried in one of the bellows, said one of the bellows being disposed for operation to deliver the conducting liquid into the well at one end of the stack to progressively bridge the conductor members, the other bellows being disposed to close the well at the other end of the stack, a gas capable of reducing arcing carried in the well above the conducting liquid, the gas and the bellows being affected by changes in temperature and atmospheric pressure, and means disposed to connect the opposed bellows together to compensate for changes in the gas and bellows in response to a change in the temperature or atmospheric pressure to maintain the operation of the sealed switching apparatus substantially unaffected by the change in the temperature or atmospheric pressure.

2. In a switching apparatus, a well adapted to receive a conducting liquid, the well being formed of a stack of alternately disposed conductor members and insulating spacer members having aligned openings therein, opposed bellows disposed at the ends of the stack communicating with the well, means for sealing the stack of alternately disposed conductor members and insulating spacer members and the opposed bellows into a gas and liquid leak-proof unit, a conducting liquid carried in one of the bellows, said one of the bellows being disposed for operation to deliver the conducting liquid into the well at one end of the stack to progressively bridge the conductor members, the other bellows being disposed to close the well at the other end of the stack, a gas capable of reducing arcing carried in the well above the conducting liquid, the gas and bellows being affected by changes in temperature and atmospheric pressure, and means disposed to connect the opposed bellows and hold them under a predetermined force at a predetermined temperature and atmospheric pressure, the connecting means maintaining the operation of the sealed switching apparatus substantially unaffected by changes in temperature or atmospheric pressure.

3. In a switching apparatus, a well adapted to receive a conducting liquid, the well being formed of a stack of alternately disposed conductor members and insulating spacer members having aligned openings therein, opposed bellows disposed at the ends of the stack communicating with the well, means for sealing the stack of alternately disposed conductor members and insulating spacer members and the opposed bellows into a gas and liquid leak-proof unit, a conducting liquid carried in one of the bellows, said one of the bellows being disposed for operation to deliver the conducting liquid into the well at one end of the stack to progressively bridge the conductor members, the other bellows being disposed to close the well at the other end of the stack, a gas capable of reducing arcing carried in the well above the conducting liquid, the gas and bellows being affected by changes in temperature and atmospheric pressure, means seated against the end of each of the opposed bellows for applying a force thereto, and means disposed to connect the force applying means and apply a force to the opposed bellows, the connecting means maintaining the operation of the sealed switching apparatus substantially unaffected by changes in temperature or atmospheric pressure.

4. In a switching apparatus, a well adapted to receive a conducting liquid, the well being formed of a stack of alternately disposed conductor members and insulating spacer member having aligned openings therein, opposed bellows disposed at the ends of the stack communicating with the well, means for sealing the stack of alternately disposed conductor members and insulating spacer members and the opposed bellows into a gas and liquid leak-proof unit, a conducting liquid carried in one of the bellows, said one of the bellows being disposed for operation to deliver the conducting liquid into the well at one end of the stack to progressively bridge the conductor members, the other bellows being disposed to close the well at the other end of the stack, a gas capable of reducing arcing carried in the well above the conducting liquid, the gas and bellows being affected by changes in temperature and atmospheric pressure, means seated against the end of each of the opposed bellows for applying a force thereto, and means disposed to connect the force applying means and apply a force to the opposed bellows, the connecting means being adjustable for adjusting the force applied to the opposed bellows, the connecting means maintaining the operation of the sealed switching apparatus substantially unaffected by changes in temperature or atmospheric pressure.

5. In a switching apparatus, a well adapted to receive a conducting liquid, the well being formed of a stack of alternately disposed conductor members and insulating spacer members having aligned openings therein, opposed bellows disposed at the ends of the stack communicating with the well, the opposed bellows having the same size and surface area, means for sealing the stack of alternately disposed conductor members and insulating spacer members and the opposed bellows into a gas and liquid leak-proof unit, a conducting liquid carried in one of the bellows, said one of the bellows being disposed for operation to deliver the conducting liquid into the well at one end of the stack to progressively bridge the conductor members, the other bellows being disposed to close the well at the other end of the stack, a gas capable of reducing arcing carried in the well above the conducting liquid, the gas and bellows being affected by changes in temperature and atmospheric pressure, and aligned means disposed to connect the opposed bellows together to compensate for changes in the gas and bellows in response to a change in the temperature or atmospheric pressure to maintain the operation of the sealed switching apparatus substantially unaffected by the change in the temperature or atmospheric pressure.

6. In a switching apparatus, a well adapted to receive a conducting liquid, the well being formed of a stack of alternately disposed conductor members and insulating spacer members having aligned openings therein, opposed bellows disposed at the ends of the stack communicating with the well, the opposed bellows having the same size and surface area, means for sealing the stack of alternately disposed conductor members and insulating spacer members and the opposed bellows into a gas and liquid leak-proof unit, a conducting liquid carried in one of the bellows, said one of the bellows being disposed for operation to deliver the conducting liquid into the well at one end of the stack to progressively bridge the conductor members, the other bellows being disposed to close the well at the other end of the stack, a gas capable of reducing arcing carried in the well above the conducting liquid, the gas and bellows being affected by changes in temperature and atmospheric pressure, and aligned means disposed to connect the opposed bellows together, the connecting means being so rigid as to prevent simultaneous expansion or contraction of the opposed bellows and to effect equal movements of the opposed bellows in the same direction relative to the stack to maintain the operation of the sealed switching apparatus substantially unaffected by changes in temperature or atmospheric pressure.

7. In a switching apparatus, a well adapted to receive a conducting liquid, the well being formed of a stack of alternately disposed conductor members and insulating spacer members having aligned openings therein, opposed bellows disposed at the ends of the stack communicating with the well, the opposed bellows having the same size and surface area, means for sealing the stack of alternately disposed conductor members and insulating spacer members and the opposed bellows into a gas and liquid leak-proof unit, a conducting liquid carried in one of the bellows, said one of the bellows being disposed for operation to delveir the conducting liquid into the well at one end of the stack to progressively bridge the conductor members, the other bellows being disposed to close the well at the other end of the stack, a gas capable of reducing arcing carried in the well above the conducting liquid, the gas and bellows being affected by changes in temperature and atmospheric pressure, and aligned means disposed to connect the opposed bellows and hold them under a predetermined force at a predetermined temperature and atmospheric pressure, the connecting means being adjustable for adjusting the force applied to the opposed bellows, the connecting means also being so rigid as to prevent simultaneous expansion or contraction of the opposed bellows and to effect equal movement of the opposed bellows in the same direction relative to the stack to maintain the operation of the sealed switching apparatus substantially unaffected by changes in temperature or atmospheric pressure.

KIRK A. OPLINGER.